(12) United States Patent
Martin et al.

(10) Patent No.: US 8,878,100 B2
(45) Date of Patent: Nov. 4, 2014

(54) METHOD AND APPARATUS FOR WELDING METAL PANELS HAVING FLANGES

(75) Inventors: Larry D. Martin, Sandusky, OH (US);
Brian E. Lone, Norwalk, OH (US);
James P. Gast, Vickery, OH (US)

(73) Assignee: John Bean Technologies Corporation, Chicago, IL (US)

( * ) Notice: Subject to any disclaimer, the term of this patent is extended or adjusted under 35 U.S.C. 154(b) by 1174 days.

(21) Appl. No.: 12/432,612

(22) Filed: Apr. 29, 2009

(65) Prior Publication Data

US 2010/0276408 A1 Nov. 4, 2010

(51) Int. Cl.
*B23K 11/00* (2006.01)
*B21C 27/00* (2006.01)
*B21D 39/00* (2006.01)
*B23K 37/02* (2006.01)

(52) U.S. Cl.
CPC ......... *B23K 37/0223* (2013.01); *B23K 2201/18* (2013.01)
USPC . 219/148; 219/162; 219/121.11; 219/121.13; 219/121.35; 219/136; 428/598; 428/603; 428/166; 228/173.2; 228/173.4; 228/173.6; 228/173.7; 228/235.2

(58) Field of Classification Search
CPC ................ B23K 2201/18; B23K 37/0223
USPC .......... 219/148, 162, 121.11, 121.13–121.14, 219/121.35, 121.6, 121.73, 121.21–121.32, 219/126–129, 136, 137.2; 428/598, 603, 428/166; 228/173.2, 173.4, 173.6, 173.7, 228/235.2

See application file for complete search history.

(56) References Cited

U.S. PATENT DOCUMENTS

| | | | | |
|---|---|---|---|---|
| 3,513,613 | A | * | 5/1970 | Reid et al. ........................ 52/222 |
| 3,594,893 | A | * | 7/1971 | Kuypers ..................... 228/173.2 |
| 3,726,414 | A | * | 4/1973 | Konstant ....................... 211/191 |
| 3,818,172 | A | | 6/1974 | Larsson |
| 3,870,853 | A | | 3/1975 | Reinhardt |
| 3,937,918 | A | | 2/1976 | Robertson |
| 4,010,346 | A | | 3/1977 | Cecil |

(Continued)

FOREIGN PATENT DOCUMENTS

| | | |
|---|---|---|
| CH | 421455 A | 9/1966 |
| EP | 1 815 938 A1 | 8/2007 |

(Continued)

OTHER PUBLICATIONS

Invitation to Pay Additional Fees and Partial International Search Report mailed Oct. 14, 2010, issued in corresponding International Application No. PCT/US2010/028029, filed Mar. 19, 2010, 5 pages.
International Search Report and Written Opinion mailed Dec. 10, 2010, issued in corresponding International Application No. PCT/US2010/028029, filed Mar. 19, 2010, 18 pages.

*Primary Examiner* — Dana Ross
*Assistant Examiner* — Ket D Dang
(74) *Attorney, Agent, or Firm* — Christensen O'Connor Johnson Kindness PLLC

(57) ABSTRACT

Methods are provided for joining two panels by welding together a seam formed at a flange of each panel using a welding tractor adapted to travel along the seam to be welded. A welding tractor adapted for use in the methods is also provided, as is a welded panel product fabricated using the methods provided.

21 Claims, 5 Drawing Sheets

(56) References Cited

U.S. PATENT DOCUMENTS

| | | | |
|---|---|---|---|
| 5,256,466 A * | 10/1993 | Berringan et al. | 428/166 |
| 5,538,076 A * | 7/1996 | Nishida et al. | 165/76 |
| 5,941,446 A * | 8/1999 | Yasui | 228/157 |
| 6,644,083 B2 * | 11/2003 | Pakker | 72/86 |
| 6,953,907 B2 * | 10/2005 | Ananthanarayanan et al. | 219/59.1 |
| 2004/0035833 A1 * | 2/2004 | Ananthanarayanan et al. | 219/59.1 |

FOREIGN PATENT DOCUMENTS

| | | |
|---|---|---|
| FR | 2416079 A1 | 8/1979 |
| GB | 1 529 682 A | 10/1978 |
| GB | 2 174 325 A | 11/1986 |

* cited by examiner

METHOD AND APPARATUS FOR WELDING METAL PANELS HAVING FLANGES

TECHNICAL FIELD

The present disclosure relates to methods and apparatus for welding together metal panels, as well as products fabricated using the method.

BACKGROUND

A portion of the cost of products incorporating welded seams joining metal panels is attributed to the material cost of the metal panels that are welded, as well as the length of time required to perform the welding. Enclosures, such as freezers and ovens, are typically manufactured using relatively thick stainless-steel panels (e.g., 16-gauge) welded in the field using tungsten-inert-gas (TIG) welding. The thick metal contributes to the cost of the finished product, as does the TIG welding, which is relatively slow when compared to other welding techniques.

An improvement to the welding of enclosures is the use of metal-inert-gas (MIG) welding instead of TIG welding, which delivers a speed increase from, for example, 2 inches per minute (TIG) to 12 inches per minute (MIG). However, MIG welding is difficult to perform in the field (as opposed to in the manufacturing shop) because of the inert gas requirements (e.g., wind disrupts welding by dispersing the inert gas). Additionally, manual MIG welding requires relatively thick metal so as to avoid warping due to thermal effects during welding.

Other methods for improving the speed and overall efficiency of welding panels include automated seam-tracking systems. Representative seam tracking systems include systems having laser tracking using optical transmission and detection to visualize a seam and guiding a welding apparatus along the detected seam. Laser tracking systems require a large welding apparatus that includes not only a welding head, but also a complex optical system and related processing equipment for utilizing laser tracking. Because of its large size, laser tracking is typically only possible in a manufacturing shop environment and is not portable to the field.

Another method for seam tracking includes the use of a stylus probe for tracking a seam, where a stylus is set in a seam and guides the welding apparatus based on physical contact between the stylus and the seam. Stylus probe tracking systems have been shown to weld seams at approximately 30 inches per minute, an improvement over manual welding. However, the use of a stylus probe tracking system requires tracks to be mounted parallel to the weld seam and a typical unit weighs in excess of 50 lbs. Similar to the laser optical system, the stylus probe system is bulky and requires track set up time for each weld.

Hygiene-sensitive customers, particularly those in the food industry, often require an enclosure with fully-welded seams. Fully-welded seams are more time-consuming to fabricate compared to spaced apart or periodic welds and also create thermal-management issues that reduce the speed at which a weld can be made due to the possibility of warping from localized heating. Additionally, insulated panels used for forming insulated enclosures are particularly susceptible to warping and damage from localized heating during welding.

A method for fabricating fully-welded enclosures made from relatively thin metal material that can be welded at a high rate of speed would be beneficial for the manufacturing of welded enclosures. By using thinner material, material costs would be saved, and by welding more quickly, labor costs would be saved and production could be increased. However, heat-management issues and a lack of a field-deployable automated seam-tracking welder have thus far precluded such a method.

SUMMARY

In one aspect a tractor is provide that is adapted to weld a first panel having a first flange, to a second panel having a second flange, the first and second flanges positioned adjacent, the tractor comprising: a body supporting a welding head adjacent a seam formed by the first and second flanges; and a propulsion system comprising a first wheel depending from the body and oriented to ride along one of the first and second flanges and a motor adapted to drive the first wheel to propel the tractor along the flanges, wherein the tractor is guided by the first wheel adapted to press against one of the first and second flanges to urge the two flanges toward each other.

In another aspect, a method is provided for joining two panels by welding. In one embodiment, the method includes the steps of forming a first flange extending along a first panel, said first flange extending laterally from the first panel; forming a second flange extending along a second panel, said second flange extending laterally from the second panel; positioning the first and second flanges adjacent each other in a substantially face-to-face relationship; and welding the first and second flanges together with a welding tractor adapted to travel along the two face-to-face positioned flanges, said welding tractor comprising: a body supporting a welding head adjacent a seam formed by the first and second flanges in face-to-face relationship to each other; and a propulsion system comprising a first wheel depending from the body and oriented to ride along one of the first and second flanges and a motor adapted to drive the first wheel to propel the tractor along the flanges, wherein the tractor is guided by the first wheel adapted to press against one of the first and second flanges to urge the two flanges toward each other.

In another aspect, a method is provided for joining two panels by welding, comprising the steps of: forming a first flange extending along a first panel, said first flange extending laterally from the first panel, said first flange comprising a first hem portion extending laterally from the first panel, and a first return portion overlapping the first hem portion; forming a second flange extending along a margin of a second panel, said second flange extending laterally from the second panel, said second flange comprising a second hem portion extending laterally from the second panel, and a second return portion overlapping the second hem portion; positioning the first and second flanges adjacent each other in a substantially face-to-face relationship; and welding the first and second flanges together with a welding tractor adapted to travel along the two face-to-face positioned flanges.

In another aspect, a welded panel is provided, comprising a first panel welded to a second panel, wherein the first panel comprises a first flange extending along the first panel, said first flange extending laterally from the first panel, said first flange comprising a first hem portion extending laterally from the first panel, and a first return portion overlapping the first hem portion, wherein the second panel comprises a second flange extending along the second panel, said second flange extending laterally from the second panel, said second flange comprising a second hem portion extending laterally from the second panel, and a second return portion overlapping the second hem portion, and wherein the first and second flanges are welded together positioned adjacent each other in a substantially face-to-face relationship.

DESCRIPTION OF THE DRAWINGS

The foregoing aspects and many of the attendant advantages of the subject matter described herein will become more readily appreciated as the same becomes better understood by reference to the following detailed description, when taken in conjunction with the accompanying drawings, wherein.

DETAILED DESCRIPTION

The embodiments described herein include methods for joining two panels by welding together a seam, formed by a flange on each panel, using a welding tractor adapted to travel along the seam to be welded. A welding tractor adapted for use in the method is also provided, as is a welded panel product fabricated using the methods provided.

Briefly, the method for joining two panels by welding includes the forming of two panels, each having a flange extending laterally from the panel. In one embodiment, at least one flange includes a hem portion and a return portion overlapping the hem. The two panel flanges are aligned in a face-to-face position and a welding tractor is used to weld along the seam formed by the face-to-face flanges of the two panels. The welding tractor is adapted to travel along the flanges. The tractor includes a body supporting a welding head and a propulsion system that includes a motor and at least one wheel adapted to ride along a flange so as to propel the tractor along the seam to be welded. Additionally, pairs of wheels depending from the tractor can optionally be engineered such that the wheels on opposing sides of the flanges press the flanges together so as to facilitate a closer joining of the panels to be welded.

The product of the method includes a welded panel comprising the two adjacent panels welded together, joined at their flanges in a face-to-face configuration. The term "panel" is used to generally describe a sheet of metal. Panels include insulated and non-insulated panels, as well as other metal sheets. Typical applications of the method include welding insulated panels for enclosures, non-insulated panels welded to form a cladding to be attached to a wall or surface, and welding relatively thick metal (e.g., 11-gauge steel) for forming, for example, bulkheads.

Figure 1:
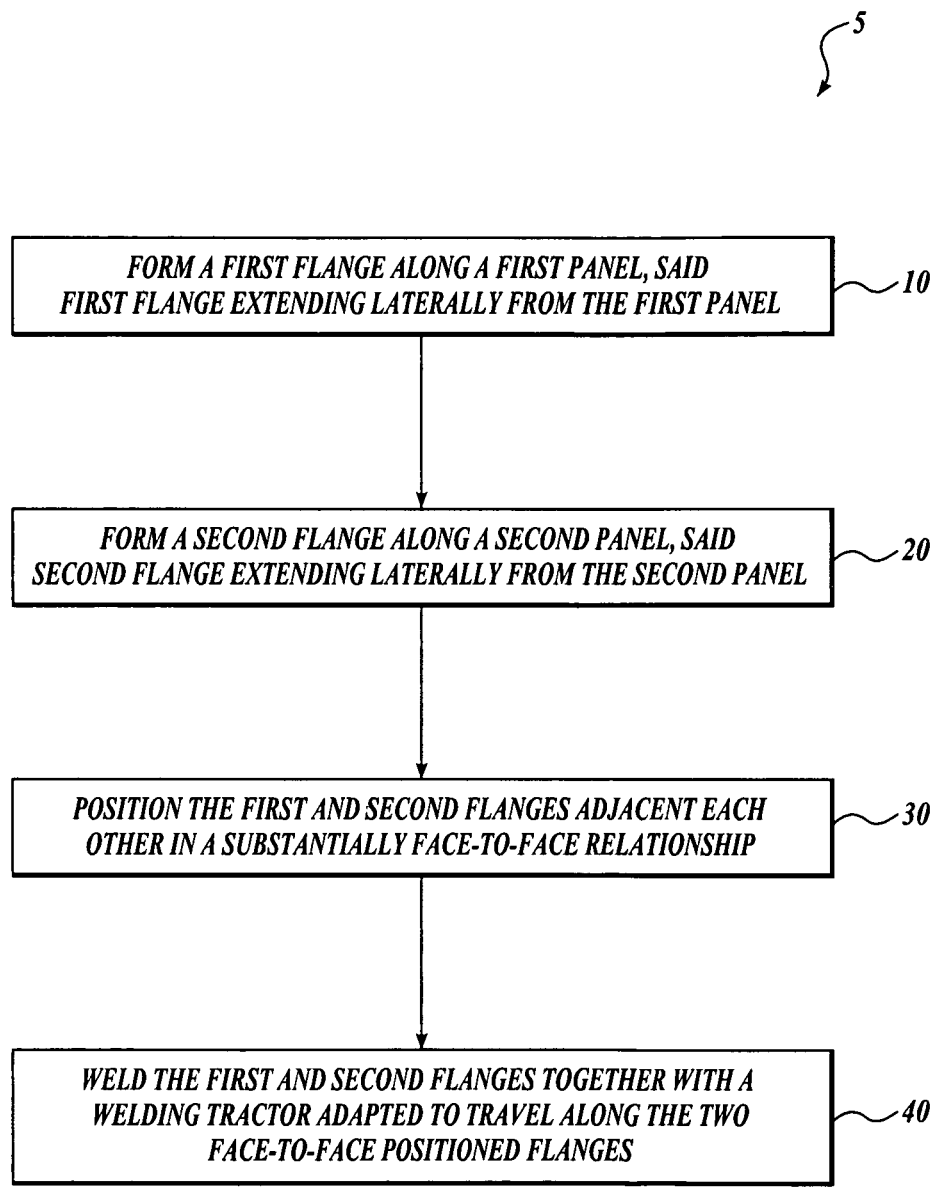
FIG. 1 is a block diagram representing a process flow of a representative method for welding together panels using a welding tractor in accordance with the embodiments described herein.

The embodiments will now be described in further detail with reference to FIGS. 1-5. Referring to FIG. 1, a block diagram representing a process flow of a representative method for welding together two panels 101 and 105 using a welding tractor 200 in accordance with the embodiments described herein. The method 5 begins with a step 10 of forming a first flange 102 along a first panel 101, said first flange extending laterally (ideally substantially perpendicularly) from the first panel. The first panel is made from metal and, in a representative embodiment, the first panel is stainless steel. Other materials, such as aluminum, can also be used.

Figure 2:
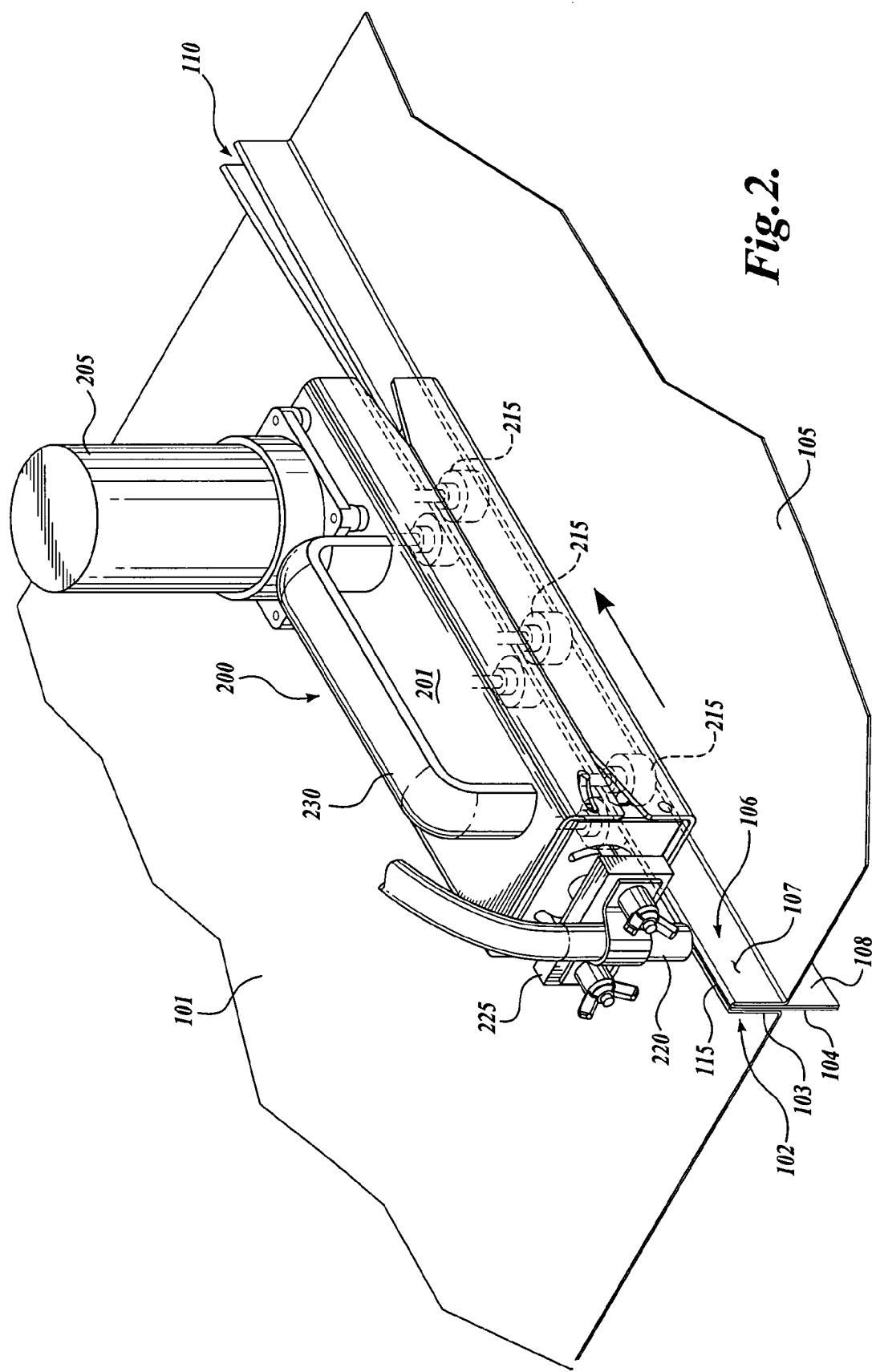
FIG. 2 is a perspective view of a welding tractor having partially welded a seam formed by flanges of two panels, upon which the welding tractor is adapted to travel, in accordance with the embodiments described herein.
Figure 3:
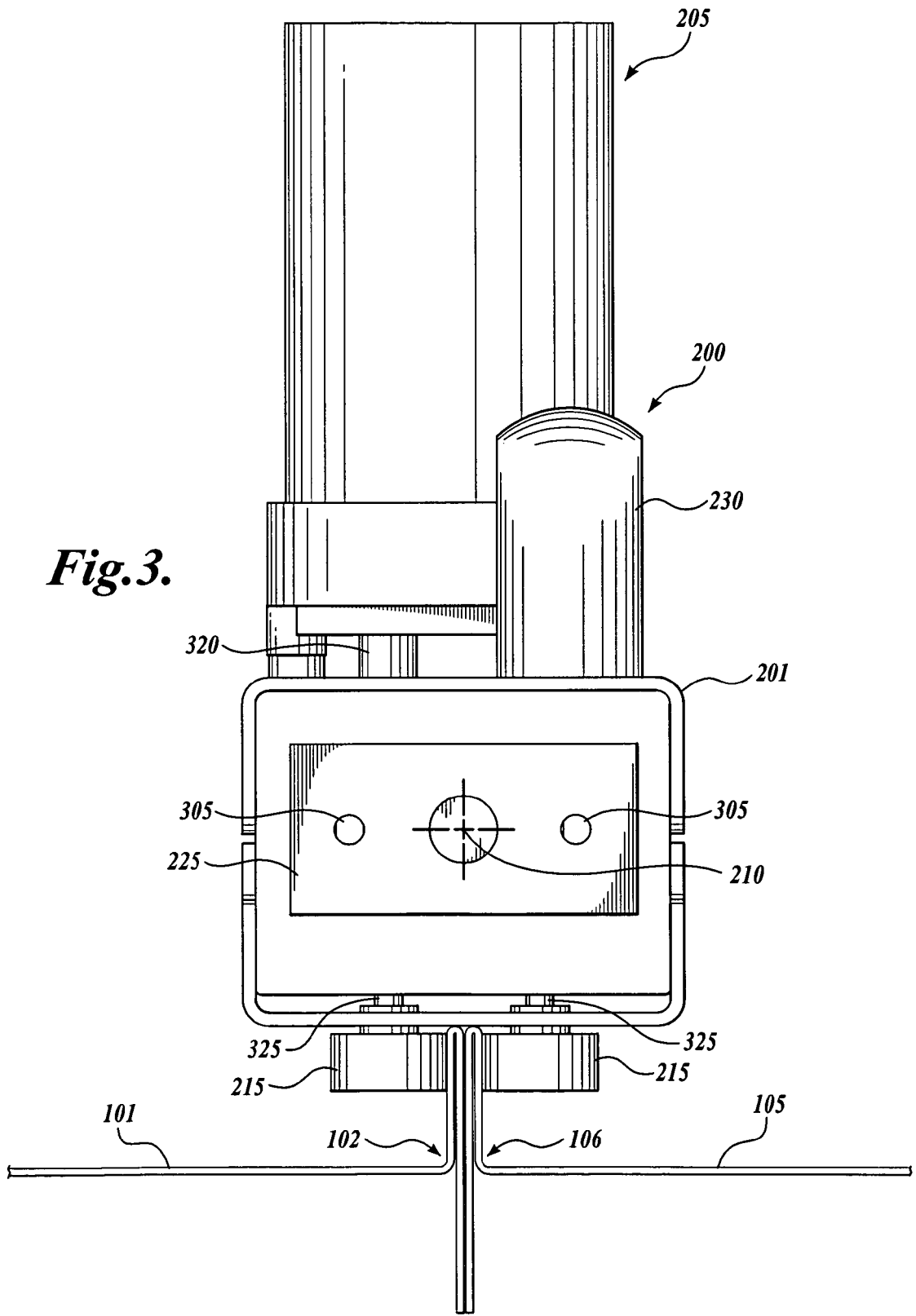
FIG. 3 is a front view of a welding tractor situated upon the seam formed by the flanges of two panels in accordance with the embodiments described herein.
Figure 5:
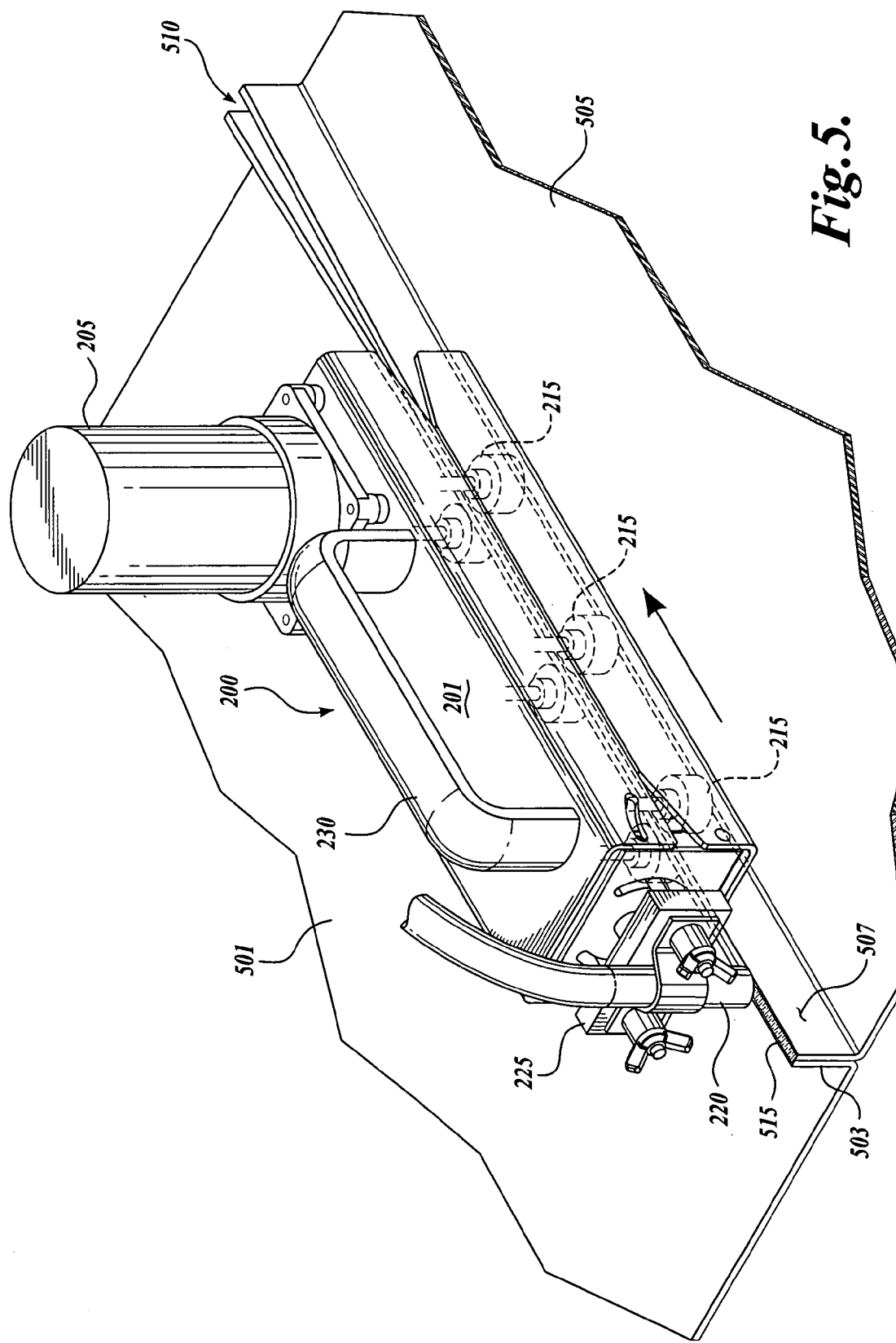
FIG. 5 is a perspective view of a welding tractor having partially welded a seam formed by flanges of two panels, upon which the welding tractor is adapted to travel, in accordance with the embodiments described herein.

As illustrated in the representative embodiments of FIGS. 2 and 3, the first flange may include a first hem portion 103 extending laterally from the first panel, and a first return portion 104 overlaps the first hem portion. FIG. 5 illustrates flanges 503 and 507 with no hem or return being welded by a tractor 200.

In the representative embodiment where the flange is a hemmed flange, the flange comprising a hem and a return can be fabricated at the margin of the panel by methods known to those of skill in the art. One or both of the flanges may have a hemmed return. The flange need not be perpendicular to the panel, and may extend laterally from the panel at an angle greater than or less than 90 degrees. The hem extends laterally and the metal is bent over on itself so as to create a return from the hem that overlaps the hem. The return may extend only partially down the length of the hem, the return may extend to the junction of the hem and panel, or it may extend beyond the junction of the hem and panel. The length of the return, particularly if it extends beyond the junction of the hem and panel, can act as a heat management mechanism, by which warping of the panels during welding can be avoided (i.e., the return acts as a heat sink). The portion of the return extending beyond the hem can be bent and/or folded to overlie the adjacent surface of the panel.

The width of the hem is defined in part by the size of the welding tractor used to weld the first panel to the second panel, as will be described further below. So as to conserve material, the hem width can be minimized to use a minimum amount of metal, yet the hem should be wide enough to accommodate the welding tractor. In an exemplary embodiment, the width of the hem is about ⅝" when 20-gauge stainless steel is the panel material. In one embodiment, the panel material has a thickness of from 11 gauge to 20 gauge.

The method 5 continues with a step 20 of forming a second flange 106 along a second panel 105. The second flange extends laterally from the second panel The second panel is formed using materials and methods similar to those described in relation to the first panel. The dimensions of the second panel need not be identical to those corresponding features of the first panel.

In one embodiment, as illustrated in FIGS. 2 and 3, a second hem portion 107 extends laterally from the second panel, and a second return portion 108 overlapping the second hem portion.

The method 5 continues with a step 30 that includes positioning the first and second flanges 102 and 106 adjacent each other in a substantially face-to-face relationship. So as to facilitate the welding of the first and second panels together, the flanges of the panels are arranged in a face-to-face manner, as illustrated in FIGS. 2, 3, and 5. A seam is formed between the first flange and the second flange. The flanges are arranged such that a welding tractor (as will be described later) adapted to travel along such a seam can travel and weld along the first flange, seam, and second flange.

The method 5 concludes with a step 40 of welding the first and second flanges together with a welding tractor 200 adapted to travel along the two face-to-face positioned flanges. The welding tractor includes a body 201, from which depends at least one drivewheel 215, adapted to travel along the seam first flange or second flange. As illustrated in the representative embodiments of FIGS. 2-5, a plurality of drive wheels 215 may also depend from the body 201. A motor 205 drives at least one of the wheels 215 of the welding tractor such that the tractor can move along the seam and the flanges. Motors useful for driving the wheel(s) of the tractor are known to those of skill in the art and include electric, hydraulic, and pneumatic motors. In one embodiment, the tractor can move in both forward and rearward directions.

The tractor includes a mount for a welding head 220, which is positioned adjacent to the seam. The mounting for the welding head, in a representative example, can be adjusted positionally so as to alter the distance of the gun from the seam to be welded, the distance of the gun from the welding tractor body, and the angle, both latitudinally and longitudinally, at which the welding head is aimed at the seam.

Referring now to an exemplary embodiment illustrated in FIGS. 2 and 3, a first panel 101 having a first flange 102 comprising a first hem 103 and a first return 104 is illustrated. A second panel 105 is also illustrated, having a second flange 106 comprising a second hem 107 and a second return 108. The first panel 101 and the second panel 105 are positioned such that the first flange 102 and the second flange 106 are adjacent each other in a substantially face-to-face relationship. As illustrated in FIGS. 2 and 3, the first return 104 and the second return 108 are in a face-to-face relationship and form a seam 110 (exaggerated for the purposes of clarity) between the first flange 102 of the first panel 101 and the second flange 106 of the second panel 105.

A welding tractor 200 is adapted to travel along the first flange 102, second flange 106, and seam 110. The welding tractor 200 includes a tractor body 201 and a motor 205 mechanically coupled to at least one of a plurality of wheels 215 (partially illustrated in phantom). The wheels 215 are adapted to travel along the sides of the first flange 102 and the second flange 106, such that the two flanges are brought together by the wheels 215 to facilitate a close fit between the first panel 101 and the second panel 105 for welding. The wheels optionally have chamfered surfaces.

A welding head 220 is attached to the tractor body 201 by an attachment plate 225, spaced from one end of the tractor body 201. The attachment plate 225 is mounted to the tractor body 201 to have freedom of movement in several directions (e.g., latitudinally, longitudinally, and azimuthally), thus allowing for the welding head 220 to be positioned above the seam 110 optimally.

The welding tractor 200, as described herein, will be described for the purposes of simplicity as having a rear end that includes the welding head 220 and a front end that includes the motor 205. The tractor 200 illustrated in the exemplary embodiment of FIG. 2 has traveled in a forward direction, as depicted by the open seam 110 at the front of the tractor 200 and a welded seam 115 illustrated at the rear of the tractor 200. In the illustrated embodiment of FIG. 2, if the remainder of the seam 110 were desired to be welded, the tractor 200 would continue traveling forwards and the seam 110 would be further welded. It will be appreciated that the tractor 200 can be engineered to travel in both a forward and rearward direction based on the motor 205 used and how the motor 205 is mechanically interfaced with the plurality of wheels 215.

Additionally, a manually graspable handle 230 is illustrated as attached to the top of the tractor body 201. The handle 230 allows for transport of the tractor 200 between panels to be welded and to facilitate use of the tractor 200 in the field (as opposed to in a manufacturing shop).

Referring specifically to FIG. 3, a front-end view of the welding tractor 200 is illustrated supported on the flanges 102, 106 of the panels 101 and 105 to be welded. The welding head 220 has been removed from this view of the tractor 200 for ease of viewing. In place of the welding head 220, the attachment plate 225 is illustrated having holes 305 for attachment of the welding head 220 to the body 201 by support arms 330.

The welding tractor 200 illustrated in FIG. 3 is driven by a motor 205 mechanically connected to at least one of the plurality of wheels 215 by a drive shaft 320. In the exemplary tractor 200 illustrated in FIG. 3, wheels 215 that are not mechanically connected to the motor 205 depend from the body 201 through idler shafts 325. It will be appreciated that the drive shaft 320 may be connected to a single wheel or to multiple wheels, depending on the desired function of the tractor 200. Wheels 215 not connected to the motor 205 are idler wheels.

Referring still to FIG. 3, the wheels 215 are in rolling contact with the first flange 102 of the first panel 101 and the second flange 106 of the second panel 105. The wheels 215 not only apply pressure to the flanges 102, 106, tending to force them together, but also help to guide the tractor 200 along the seam formed by the flanges 102, 106, which is the seam to be welded by the tractor 200. Thus, a welding tractor 200 is provided that tracks the seam 110 to be welded using the same structure as is used to propel the tractor 200 (i.e., wheels 215).

In one embodiment, the idler shafts 325 are attached to the body 201 in a manner that allows for some lateral movement of the wheels 215 such that small imperfections on the flanges 102, 106 can be smoothly traveled over without disrupting welding. In a representative example, such a system can be implemented using a spring-like pressure source applied to the idler shafts 325 attached to the wheels 215. A representative spring-like mechanism may include a ball spring providing lateral pressure towards the flange side of the idler shafts 325 such that a constant pressure is applied to the idler shafts 325, yet the idler shafts 325 are allowed to flex laterally towards or away from the flanges 102 and 106 if defects are encountered along the tractor 200 travel path. It will be appreciated that other defect damping mechanisms can also be utilized in the tractor 200.

Figure 4:
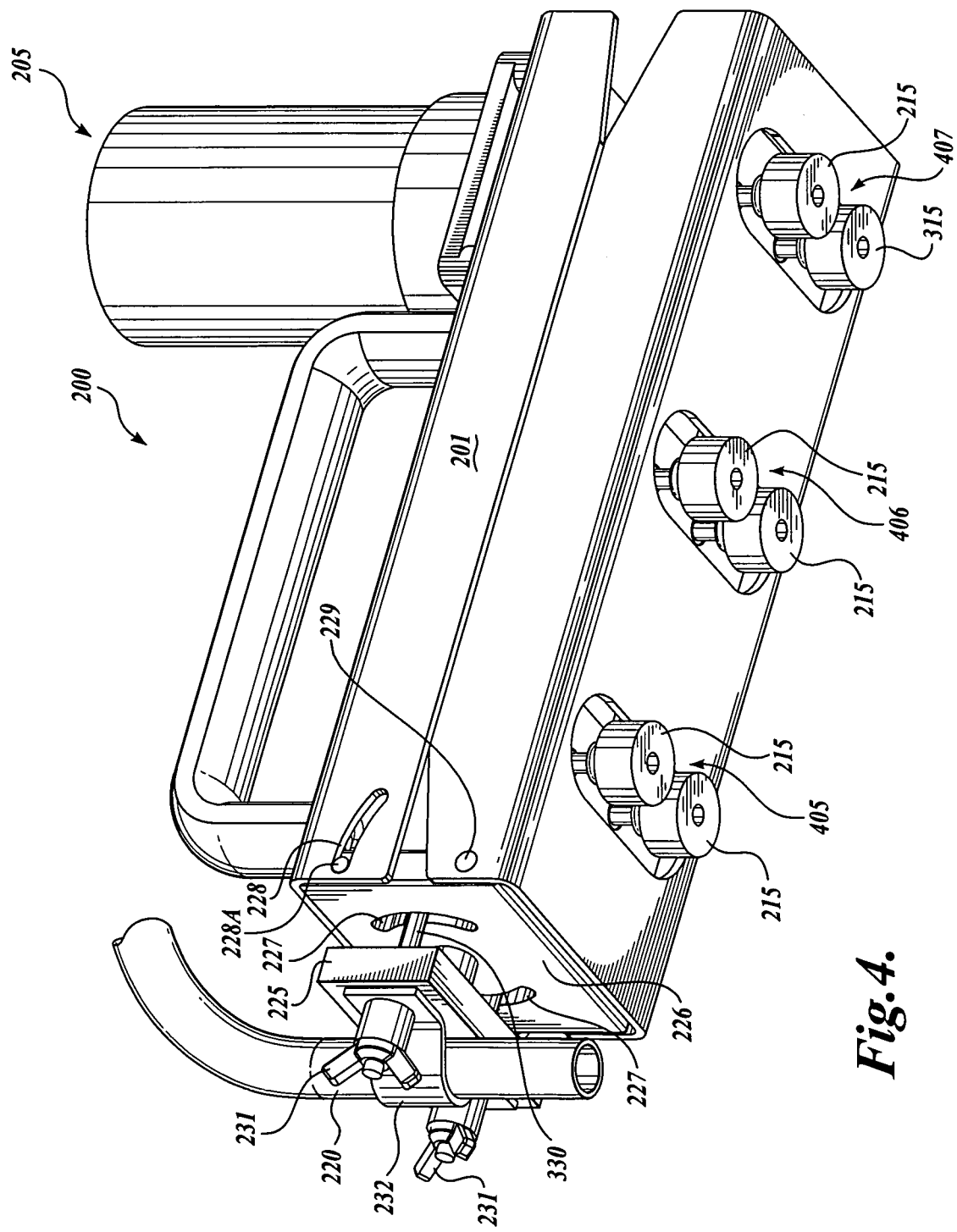
FIG. 4 is a perspective view of the bottom portion of a welding tractor in accordance with the embodiments described herein.

Referring specifically to FIG. 4, a perspective view of the bottom side of the tractor 200 is illustrated. Two types of wheels are illustrated, idler wheels 215 not mechanically connected to the motor 205, and a drive wheel 315 mechanically connected to the motor (via a drive shaft 320, not pictured). The wheels 215 and 315 of the tractor can be grouped into three pairs: first pair 405, second pair 406, and third pair 407, each comprising two wheels. The lateral spacing between each pair of wheels 405, 406, 407 need not be identical, and the spacing between pairs can be varied so as to produce a particular effect with regard to the panels to be welded. For example, the lateral spacing between first pair 405 may be smaller than the lateral spacing between the second pair 406, which is in turn smaller than the third pair 407 spacing, such that the wheels taper in lateral width between the pairs 405, 406, 407 from the smallest spacing at the first pair 405 to the largest spacing at third pair 407. The effect of such a tapering is the narrowing of the width of the seam formed by the first flange 102 and second flange 106 when the tractor 200 is in forward operation. The use of such a tapering of wheel pair 405, 406, 407 spacings facilitates the pre-welding joining together of the panels to be welded (e.g. 101 and 105) as the wheels press the flanges together such that the final wheel pair 405 prior to the welding head 220 provides the most pressure on the flanges. The use of the wheel pairs to draw the flanges together prior to welding beneficially requires fewer, or no, tack welds.

Drive wheels (e.g., 315) and idler wheels (e.g., 215) can be different in composition, particularly with regard to the surface of the wheels. For example, drive wheels having rubberized surfaces can be used to improve traction of the wheels on the surface of the flanges (e.g., 102 and 106). Representative wheel surface materials include polymers and stainless steel.

In one embodiment, the wheel pairs 405, 406, and 407 are all equally vertically spaced from the body 201. In another embodiment, at least one wheel pair (e.g., 407) is vertically spaced from the body 201 at a smaller distance than the other wheel pairs (e.g., 405 and 406). In an exemplary embodiment, a wheel pair (e.g., 407) including a drive wheel (e.g., 315) is vertically spaced closer to the body 201 than other wheel pairs (e.g., 405 and 406) to reduce the force input required from the motor 205 to drive the tractor 200.

Also illustrated in FIG. 4 are components for adjusting the position of the welding head 220. The welding head 220 is attached to the body 201 of the tractor 200 via an attachment plate 225. The attachment plate 225 can be adjusted in distance longitudinally in relation to the body 201, i.e., toward or away from the adjacent end of the body 201. In addition, a tilt plate 226 can longitudinally adjust the azimuthal angle of the welding head 220 as facilitated by a pivot 229 connecting the lower portion of the tilt plate 226 to the body 201, and an arcuate slot 228 for positioning the azimuthal angle of the tilt plate 226 and, thus, the welding head 220. Pins 228A ride in slots 228.

The lateral azimuthal angle of the welding head 220 is adjusted about a longitudinal axis 210 using matching arcuate slots 227 in the tilt plate 226, through which arms 330 are positioned to guide the lateral azimuthal positioning of the attachment plate 225 and welding head 220.

Fasteners 231 are illustrated, in this exemplary embodiment, as wing nuts engaged on the distal ends of arms 330 (e.g., threaded bolts) to secure the attachment plate 225 to the bolts and also to clamp the welding head 220 to the plate 225 via a band clamp or bracket 232. It will be appreciated that other means for attachment of the welding head 220 to the tractor body 201 are sufficient.

Representative welding heads 220 useful in the disclosed embodiments include metal-inert-gas welding apparatus, which can be adapted to provide a welding head 220 attached to the tractor 200 and having delivery and control aspects of the welding apparatus located on board or separate from the tractor.

The tractor can be controlled using either on-board controls, remote wireless controls, or remote wired controls. The speed of the tractor 200, direction of travel (i.e., forwards or backwards), and the operation of the welding head 220 are all controlled when welding a seam using the tractor 200.

The combination of the tractor adapted to travel along the seam 110 to be welded and the welding head 220 allows for unusually fast welding of seams joining two panels 101 and 105, such that the welded seam 115 is a continuous weld, as is required for particular goods manufactured using welded panels.

The flanges 102 and 106 not only form a guide on which the tractor 200 moves, but also produce a seam 110 that is positioned to be welded by the tractor 200 guided along the flanges 102 and 106. In embodiments that include hemmed flanges, by adjusting the size (e.g., width and thickness) of the hem 103 and 107 and return 104 and 108, the amount of panel material used to form the flanges 102 and 106 can be modified. The length of the returns 104 and 108 impact heat dispersion during welding; longer returns 104 and 106 act as heat sinks and reduce thermal warping of the panels 101 and 105. By managing heat during welding, seams 110 can be welded more quickly and with fewer thermally-induced deformations of the panels 101 and 105. Thus, the combination of the flanged panels 101 and 105 and the welding tractor 200 allow for efficient welding of metal panels of relatively thin material that produces a continuous weld joining the panels 101 and 105.

In an exemplary embodiment, the hems 103 and 107 are ⅝" wide hemmed edges of a 20-gauge stainless steel material and the returns 104 and 108 are 1¾" wide of material substantially perpendicular to the panels 101 and 105. The width of returns used in this example results in minimal distortion (approximately 0.045" per 24" welded) while also minimizing the amount of panel material used. During operation of the welding tractor along the seam, various parameters are adjusted, including MIG welding voltage, welding amps, speed of wire fed into the welding head, the tractor travel speed, and the welding arc control. Based upon an experimental optimization of these factors, the best result achieved for a continuous weld along the seam were in the range of 85" to 118" per minute, roughly an order of magnitude faster manual welding. The exemplary welds described herein resulted in a low localized heat input, thus lowering the probability of damaging insulation that may be located beneath the insulated panels, as well as reducing panel warpage.

The tractor can be operated in both a vertical, horizontal, or diagonal direction and is transportable such that welding can be performed in the field as well as in a manufacturing shop.

The tractor 200 is usefully for welding any configuration of flanges that are brought together to form a seam upon which the tractor can be configured to mount and weld. In representative embodiments described above, the seam is formed by hemmed flanges. Flanges without hems are illustrated in FIG. 5, a representative embodiment wherein a welding tractor 200, similar to that described above, is shown welding a first panel 501 and a second panel 505 at a seam 510 formed by the flanged margins 503 and 507 of the panels 501 and 505 (respectively). The tractor 200 is shown moving (and welding) in the direction of the arrow, and a welded seam 515 joins the flanged margins 503 and 507 of the panels 501 and 505. The operation of the tractor 200 in this embodiment is similar to above-described embodiments. The panels 501 and 505 are of similar materials as those of previously-described embodiments.

In this embodiment, the tractor is guided by and travels along a flange formed at the margin of two panels. The method of this embodiment is particularly suited for welding the flanges of panels where temperature sensitivity of the panel material is not a significant consideration. For example, insulated panels can be damaged by local heating from welding, as described above. Thus, representative panels welded using the method of the present embodiment include non-insulated panels (e.g., panels welded to form a wall cladding).

While illustrative embodiments have been illustrated and described, it will be appreciated that various changes can be made therein without departing from the spirit and scope of the invention. For example, the wheels 215 can be replaced by a track system generally of the nature used on snowmobiles or a crawler-type vehicle.

The embodiments of the invention in which an exclusive property or privilege is claimed are defined as follows:

1. A method for joining two panels by welding, comprising the steps of:
   (a) forming a first flange extending along a margin of a first panel, said first flange extending laterally from the first panel, said first flange comprising a first hem portion extending laterally from the first panel, and a first return portion overlapping the first hem portion away from the first panel;

(b) forming a second flange extending along a margin of a second panel, said second flange extending laterally from the second panel;

(c) positioning the first and second flanges adjacent each other in a face-to-face relationship defining an interface between a flat portion of the first return portion and a flat portion of the second flange, wherein the first and second panels are entirely abutting at the interface; and (d) welding the first and second flanges together with a welding tractor adapted to travel along the two face-to-face positioned flanges wherein the first panel and the second panel are not connected prior to welding.

2. The method of claim 1, wherein the welding tractor comprises:

a body supporting a welding head adjacent a seam formed by the first and second flanges in face-to-face relationship to each other; and a propulsion system comprising a first wheel depending from the body and oriented to ride along one of the first and second flanges and a motor adapted to drive the first wheel to propel the tractor along the flanges, wherein the tractor is guided by the first wheel, adapted to press against one of the first and second flanges to urge the two flanges toward each other.

3. The method of claim 1, wherein the second flange comprises a second hem portion extending laterally from the second panel, and a second return portion overlapping the second hem portion.

4. The method of claim 3, wherein the first return portion is on the side of the first hem portion opposite to the first panel and the second return portion is on the side of the second hem portion opposite to the second panel.

5. The method of claim 3, wherein the first return portion extends beyond the juncture of the first hem portion and the first panel and the second return portion extends beyond the juncture of the second hem portion and the second panel.

6. The method of claim 1, wherein forming the first flange comprises laterally bending the margin of the first panel to provide the first hem portion and bending the first hem portion back upon itself to provide the first return portion.

7. The method of claim 1, wherein the width of the first hem is less than the width of the first return.

8. The method of claim 1, wherein the weld is at a seam formed at the juncture of the flanges.

9. The method of claim 1, wherein the weld is a continuous weld.

10. A welded panel comprising a first panel welded to a second panel, wherein the first panel and the second panel are not connected prior to welding to form the welded panel, wherein the first panel comprises a first flange, said first flange extending laterally from the first panel, said first flange comprising a first hem portion extending laterally from the first panel, and a first return portion overlapping the first hem portion away from the first panel, wherein the second panel comprises a second flange, said second flange extending laterally from the second panel, and wherein the first and second flanges are welded together positioned adjacent each other in a face-to-face relationship defining an interface between a flat portion of the first return portion and a flat portion of the second flange, wherein the first and second panels are entirely abutting at the interface.

11. The welded panel of claim 10, wherein the second flange comprises a second hem portion extending laterally from the second panel, and a second return portion overlapping the second hem portion away from the second panel, and wherein the second return portion defines the flat portion of the second flange providing the face-to-face relationship with the first flange.

12. The welded panel of claim 11, wherein the second return portion extends to a junction of the second hem portion and the second panel.

13. The welded panel of claim 11, wherein the second return portion extends beyond a junction of the second hem portion and the second panel.

14. The welded panel of claim 11, wherein the first return portion extends beyond a junction of the first hem portion and the first panel and wherein the second return portion extends beyond a junction of the second hem portion and the second panel.

15. The welded panel of claim 11, wherein the second hem portion is a closed hem.

16. The welded panel of claim 11, wherein the first return portion and the second return portion are arranged in a face-to-face relationship.

17. The welded panel of claim 11, wherein the face-to-face relationship between the first flange and the second flange defines the first return portion abutting the second return portion.

18. The welded panel of claim 10, wherein the first return portion extends to a junction of the first hem portion and the first panel.

19. The welded panel of claim 10, wherein the first return portion extends beyond a junction of the first hem portion and the first panel.

20. The welded panel of claim 10, wherein the first hem portion is a closed hem.

21. A welded panel comprising a first panel welded to a second panel, wherein the first panel and the second panel are not connected prior to welding to form the welded panel, wherein the first panel comprises a first flange, said first flange extending laterally from the first panel, said first flange comprising a first closed hem portion extending laterally from the first panel, and a first return portion overlapping the first closed hem portion, wherein the second panel comprises a second flange, said second flange extending laterally from the second panel, said second flange comprising a second closed hem portion extending laterally from the first panel, and a second return portion overlapping the second closed hem portion;

wherein the first return portion extends beyond a junction of the first hem portion and the first panel and wherein the second return portion extends beyond a junction of the second hem portion and the second panel; and wherein the first and second flanges are welded together positioned adjacent each other in a face-to-face relationship defining an interface between a flat portion of the first return portion and a flat portion of the second return portion, wherein the first and second panels are entirely abutting at the interface.

* * * * *